March 29, 1966     S. SYLVAN     3,242,653

AUTOMATIC FILTER APPARATUS

Filed March 21, 1963

INVENTOR.
STIG SYLVAN

BY

Ralph B. Brick
ATTORNEY

United States Patent Office 3,242,653
Patented Mar. 29, 1966

3,242,653
AUTOMATIC FILTER APPARATUS
Stig Sylvan, Louisville, Ky., assignor to American Air Filter Company, Inc., Louisville, Ky., a corporation of Delaware
Filed Mar. 21, 1963, Ser. No. 267,027
7 Claims. (Cl. 55—354)

The present invention relates to apparatus for separating particulate material from a gaseous stream and more particularly to filter apparatus of the type which employs an endless belt of filter medium to separate contaminant particles from a gaseous stream.

The apparatus of the present invention has particular utility in combination with and downstream atmospheric lint condensers to insure a thorough removal of threadlike particles which might remain in an atmospheric air stream. However, it is to be understood that the subject filter apparatus is not limited to the use of aforedescribed but can be effectively utilized in any one of a number of other situations where similar conditions might obtain.

In accordance with the present invention, a filter apparatus is provided which is economical to construct and to maintain, which is efficient in operation over extended periods of time, which affords a maximum of filter area in a minimum of floor space, and which insures efficient removal of both large and small contaminant particles from a gaseous stream with a minimum of resistance to such gaseous stream. Various other features of the present invention will become obvious to one skilled in the art upon reading the disclosure set forth herein.

More particularly, the present invention provides an apparatus for separating particulate material from a gaseous stream comprising a longitudinally extending gas impervious housing; a longitudinally co-extending gas pervious, movable filter belt means disposed within the housing to define therewith adjacent upstream and downstream gas plenums, the upstream gas plenum having a cross sectional area decreasing in substantially constant and uniform manner from one end to the other; dirty gas inlet means communicating with the upstream gas plenum adjacent the extremity having the largest cross sectional area and positoned to initially deliver substantially all of the dirty gas to be treated in a path substantially parallel to the filter means; spaced clean gas outlet means communicating with the downstream gas plenum; and, particulate outlet means communicating with the upstream gas plenum adjacent the extremity having the smallest cross sectional area, the velocity of the gas stream being maintained substantially constant along the upstream side of the overall length of the filter belt means due to the shape of the upstream plenum and the manner in which the dirty gas is initially delivered so as to cause a first portion of particulate material in the dirty gas stream to be carried along a path upstream and substantially parallel the filter means to the particulate outlet means and a second portion of particulate material in the dirty gas stream to be filtered out by the filter means as the gas stream is passed therethrough to the clean gas outlet means. In addition, the present invention provides an efficiently operating, space saving arrangement wherein one of the two upstream and downstream gas plenums of the filter almost completely surrounds the other plenum. Further, the present invention provides a unique arrangement for insuring that the velocity of the gas is maintained substantially constant over the entire upstream side of the filter means.

It is to be understood that various changes can be made in the arrangement, form and construction of the apparatus disclosed herein by one skilled in the art without departing from the scope or spirit of the present invention.

Referring to the drawing, which discloses a semi-schematic arrangement of one advantageous embodiment of the present invention:

Figure 1:
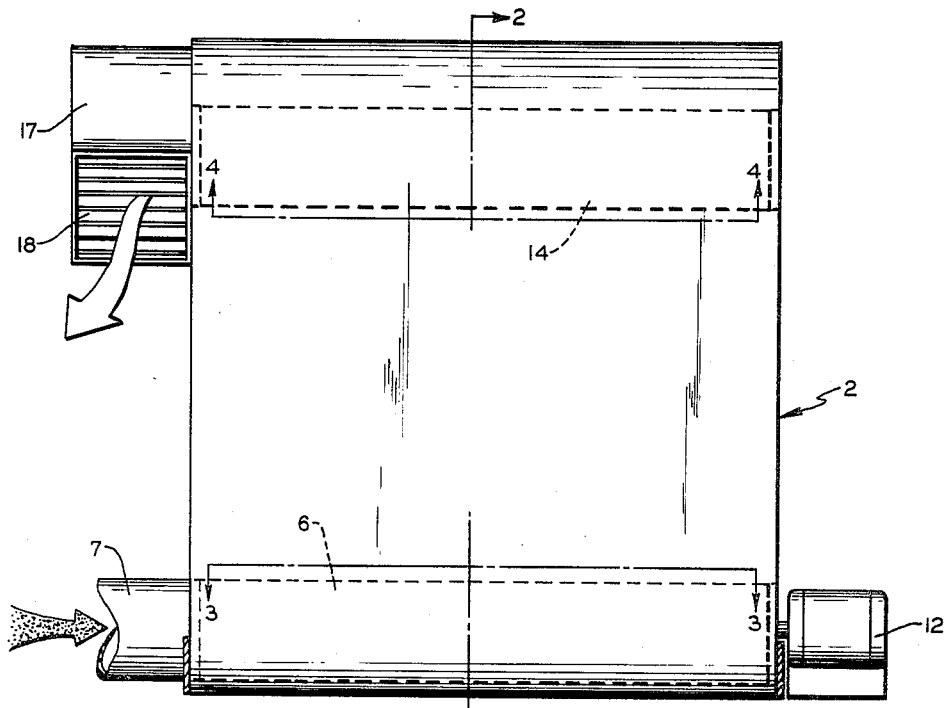
FIGURE 1 is a vertical front elevational view of the inventive apparatus.
Figure 2:
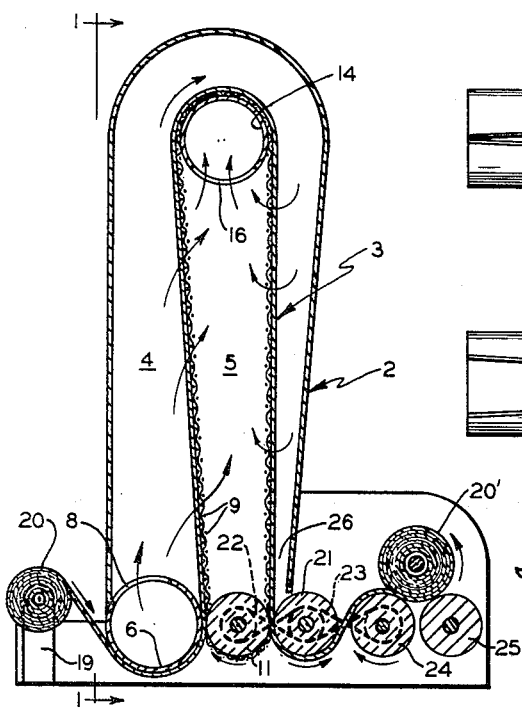
FIGURE 2 is a vertical side view of the apparatus of FIGURE 1 taken in a plane passing through line 2—2 of FIGURE 1.

As can be seen in FIGURES 1 and 2 of the drawing, the apparatus of the present invention includes a longitudinally extending, vertically positioned gas impervious housing 2, such vertical arrangement requiring a minimum of floor space and yet providing a maximum of filtering area in a manner as will be seen hereinafter.

Positioned within housing 2 is a gas pervious endless filter belt arrangement, broadly designated by reference numeral 3. It is to be noted that filter belt arrangement 3 is contoured and positioned with reference to housing 2 to define therewith upstream dirty gas plenum 4 and adjacent downstream clean gas plenum 5. Upstream plenum 4 is of horseshoe-like shape with a cross sectional area that gradually decreases from the extremity of one leg of the horseshoe to the extremity of the other leg, the plenum 4 substantially surrounding adjacent downstream gas plenum 5. It is to be understood that, if desired, downstream gas plenum 5 also can be of tapered cross sectional area and in the disclosed embodiment, a slight taper is included.

Figure 3:
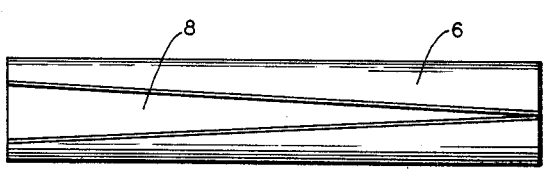
FIGURE 3 is a horizontal view taken in a plane passing through line 3—3 of FIGURE 1 disclosing the gas inlet of the inventive apparatus; and, FIGURE 4 is a horizontal view taken in a plane passing through line 4—4 of FIGURE 1 disclosing the gas outlet of the inventive apparatus.

Communicating with that leg extremity of dirty gas plenum 4 having the greatest cross sectional area and adjacent one extremity of the endless filter belt arrangement 3 is gas inlet conduit 6. Conduit 6 is arranged to extend in a horizontal plane normal to the longitudinal axis of the filter belt arrangement 3 from one side of outer housing 2 to the other. The conduit is sealed closed at one of its extremities and at its other extremity it is communicably connected to a dirty gas supply conduit 7 which serves to receive dirty gas to be treated from a source not disclosed in the drawing. It is to be understood that conduit 7 advantageously can be connected downstream of a lint condenser in a textile plant or it can be tied in with any one of a number of other types of dirty gas sources which might need filtering. It is to be noted (FIG. 3) that dirty gas inlet conduit 6 is provided with a tapered gas passage 8 which decreases in width in a gradual manner from its extremity adjacent dirty gas supply conduit 7 to its closed extremity at the opposite side of housing 2. It is to be further noted that gas passage 8 is so positioned in housing 2 relative filter belt arrangement 3 that it delivers substantially all of the dirty gas to be treated evenly into dirty gas plenum 4 in a path substantially parallel to filter belt arrangement 3.

Figure 4:
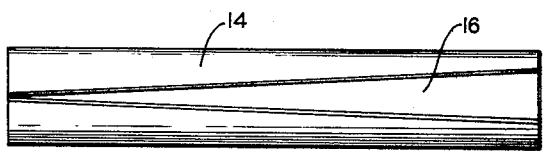

Filter belt arrangement 3 is comprised of a longitudinal, vertically extending, gas pervious endless screen 9 which serves as a filter medium support member. Screen 9 is driven through its endless path by a drive roll 11 positioned at its lower end which, as will be seen hereinafter, also serves as one roll of a compression roll pair arrangement. Roll 11 receives its power through motor 12 connected thereto. The opposite end of screen 9 is idly supported at its upper end on a clean gas outlet conduit 14. Advantageously, conduit 14 can be reticulated in such a manner as to permit the free flow of gas therethrough. As can be seen in FIGURE 4, conduit 14 includes a tapered gas outlet passage 16, gas outlet passage 16 having a width gradually decreasing in the direction of flow in conduit 14 in a direction opposite to the direction in which passage 8 gradually decreases in conduit 6. Conduit 14, like conduit 6, also extends longitudinally across housing 2 from one side thereof to the other and like conduit 6 also is closed at one extremity. Its other extremity is communicably connected to a centrifugal blower 17 mounted to the upper side of housing 2. Blower 17, in turn, is provided with a clean gas outlet 18 through which filtered clean gas empties into atmosphere.

Positioned alongside the lower portion of housing 2 adjacent dirty gas inlet conduit 6 is a filter medium supply arrangement which includes a pair of spaced roll support arms 19. A roll of clean filter medium 20, which can be selected from any one of a number of suitable and well known filter materials such as fine porous paper or gas pervious fiber glass, is mounted on support arms 19. The medium is arranged to pass around the lower portion of conduit 6 and upwardly through a narrow passage formed between conduit 6 and drive roll 11 to engage in faced relationship with one flight of endless screen 9. The media then follows the endless screen, passing upwardly along the horseshoe-like path of the endless screen to the opposite flight of such screen and downwardly through a feed and compression roll arrangement. This arrangement includes drive roll 11 and an adjacent cooperating compression roll 21. Roll 21 is driven in counter-rotational direction to drive roll 11 through linking crossed belt drive arrangement 22 which serves to connect rolls 11 and 21. A crossed belt drive arrangement 23 connects roll 21, in turn, to media take-up roll 24. The media roll 20' rests between this take-up roll and a spaced idle roll 25 so as to be friction driven along it periphery and rolled up into a roll package with the contaminant side facing inwardly. In this connection, it is to be noted that the horseshoe-shaped dirty gas plenum 4 is so arranged that its leg of smallest cross sectional area terminates in a particulate outlet passage 26 which is positioned immediately above the cooperating compression and feed rolls 11 and 21 so that contaminant particles are fed from passage 26 between rolls 11 and 21 unto medium 20.

In a typical operation of the apparatus aforedescribed, blower 17 causes dirty gas to pass from supply conduit 7 through dirty gas inlet conduit 6 and its gas passage 8 into dirty gas plenum 4 in a path parallel to filter medium 20 along endless screen 9. Due to the gradually tapered cross-sectional shape of plenum 4, the gradually tapered shape of gas inlet and gas outlet passages 8 and 16, respectively, and the manner in which the dirty gas in initially introduced in a parallel fashion into the plenum 4, the velocity of the gas stream is maintained substantailly constant along the upstream face of filter medium 20. As a result, a first portion of the gas including the larger and heavier particles in the gas stream is carried along the path upstream and substantially parallel the filter medium 20 to the narrow particulate outlet passage 26 of dirty gas plenum 4. A second portion of the gas including the lighter contaminant particles in the gas stream is filtered out by the filter medium 20 as the gas passes through the medium, clean gas outlet 16 and outlet 18 of blower 17. After a preselected period of time when the medium is loaded with contaminants, motor 12 is actuated through a suitable filter medium pressure responsive device (know in the art and not shown) to rotate roll 11 and the dirty medium is fed through the compression arrangement including rolls 11, 21. The particulate material at passage 26 also is passed through these compression rolls, being compressed onto the medium and wound up inwardly into a roll package 20' through medium take-up roll 24, the roll package resting on roll 24 and idle roll 25 to be frictionally driven by roll 24.

The invention claimed is:

1. Apparatus for seprating particulate material from a gaseous stream comprising:
   (a) a longitudinal, vertically extending gas impervious housing;
   (b) a longitudinal, vertically co-extending gas pervious endless filter medium support belt means disposed within said housing to define therewith an upstream dirty gas plenum of horseshoe-like shape with a cross-sectional area decreasing in gradual manner from one leg to the other and to define therebetween a downstream gas plenum substantially surrounded by said first gas plenum;
   (c) dirty gas upstream inlet means communicating with said horseshoe shaped dirty gas plenum at the leg extremity having the greatest cross-sectional area and adjacent one extremity of said filter medium support belt means, said dirty gas inlet means being positioned to initially deliver substantially all of the dirty gas to be treated in a path substantially parallel to thet upstream face of said filter medium support belt means;
   (d) clean gas outlet means adjacent the opposite extremity of said endless filter medium support belt means communicating with said downstream gas plenum, said dirty gas inlet and clean gas outlet means including spaced parallel, longitudinally extending oppositely tapered gas passages of gradually decreasing width with the longitudinal center lines thereof extending normal to the longitudinally extending center line of said filter medium support belt means;
   (e) particulate material outlet means communicating with said horseshoe shaped dirty gas plenum at the leg extremity having the smallest cross-sectional area, the velocity of the gas stream being maintained substantially constant along the entire upstream face of said filter medium support belt means due to the shape of said dirty gas plenum, said gas inlet and gas outlet passages and the manner in which dirty gas is introduced to cause a first portion of said gas stream to be carried along a path upstream and substantially parallel said filter medium support belt means to said particulate outlet means and a second portion of said gas stream to pass through said filter medium support belt means to said clean gas outlet means;
   (f) filter meduim supply means positioned adjacent an extremity of one flight of said endless filter medium support belt means to supply clean filter medium thereto;
   (g) filter meduim take-up means positioned adjacent a corresponding extremity of the opposite flight of said endless filter medium support belt means to take-up dirty filter medium; and
   (h) a pair of compression rolls arranged to feed said medium therethrough and compress the particulate material thereon.

2. Apparatus for separating particulate material from a gaseous stream comprising:
   (a) a longitudinally extending gas impervious housing;
   (b) a longitudinally co-extending gas pervious filter means disposed within said housing to define therewith a first gas plenum of horse-shoe like shape and a second gas plenum substantially surrounded by said first gas plenum, at least one of said plenums having a cross-sectional area decreasing in a gradual manner from one end to the other to serve as a dirty gas plenum;
   (c) dirty gas inlet means communicating with said dirty gas plenum to initially deliver substantially all of said dirty gas to be treated in a path substantially parallel to said filter means;

(d) spaced clean gas outlet means communicating with the other of said gas plenums, said dirty gas inlet means and said clean gas outlet means comprising oppositely tapered gas passages of gradually decreased width extending transverse the direction of gas flow in the respective plenums and positioned in opposed spaced relationship to each other at opposite extremities of said housing; and (e) particulate material outlet means communicating with said dirty gas plenum, the velocity of the gas stream being maintained substantially constant along the entire upstream face of said filter means due to the tapered shape of said dirty gas plenum, said gas inlet and gas outlet passages and the manner in which said gas is delivered to cause a first portion of particulate material in said gas stream to be carried along a path upstream and substantially parallel said filter means to said particulate outlet means and a second portion of particulate material to be filtered out by said filter means as said gas stream passes therethrough to said clean gas outlet means.

3. The apparatus of claim 2, said filter means including:

(a) an endless gas pervious filter medium support belt having spaced opposed support flights;

(b) filter medium supply means positioned adjacent an extremity of one flight of said endless filter medium support belt to supply clean filter medium thereon; and (c) filter medium take-up means positioned adjacent a corresponding extremity of the opposite flight of said endless filter medium support belt to receive dirty filter medium.

4. The apparatus of claim 3, said filter medium take-up means being positioned adjacent said particulate outlet means and including a pair of compression rolls arranged to feed said filter medium therethrough and compress said particulate material thereon.

5. Apparatus for separating particulate material from a gaseous stream comprising:

(a) a longitudinally extending gas impervious housing;

(b) a longitudinally co-extending gas pervious movable filter means disposed within said housing to define adjacent upstream and downstream gas plenums having a filtering area therebetween, said upstream gas plenum having a cross-sectional area decreasing in a gradual manner along the line of flow from one end to the other;

(c) dirty gas inlet means communicating with said upstream gas plenum adjacent the extremity having the largest cross-sectional area to initially deliver substantially all of the dirty gas to be treated in a path substantially parallel to the upstream face of said filter means;

(d) spaced clean gas outlet means communicating with said downstream gas plenum, said dirty gas inlet means and said clean gas outlet means comprising oppositely tapered gas passages of gradually decreased width extending transverse the direction of gas flow in the respective plenums and positioned in opposed spaced relationship to each other at opposite extremities of said housing; and (e) particulate material outlet means communicating with said dirty gas plenum, the velocity of the gas stream being maintained substantially constant along the entire upstream face of said filter means due to the tapered shape of said dirty gas plenum, said gas inlet and gas outlet passages and the manner in which said gas is delivered to cause a first portion of particulate material in said gas stream to be carried along a path upstream and substantially parallel said filter means to said particulate outlet means and a second portion of particulate material to be filtered out by said filter means as said gas stream passes therethrough to said clean gas outlet mean.

6. The apparatus of claim 5, said filter means comprising:

(a) a filter medium supply means positioned adjacent an extremity of said filtering area to supply clean filter medium to said filtering area; and (b) a filter medium take-up means positioned adjacent the opposite extremity of said filtering area to take up dirty filter medium from said filtering area.

7. The apparatus of claim 6, said filter medium take-up means comprising:

(a) a pair of compression rolls adjacent to and downstream said particulate outlet means arranged to feed said filter medium therethrough and compress particulate material thereon;

(b) a filter medium take-up roll adjacent said compression rolls and driven thereby to take up said filter medium in roll form; and (c) an idle roll spaced from said take-up roll to cooperatively support dirty filter medium as it is taken up in such roll form.

References Cited by the Examiner

UNITED STATES PATENTS

| | | | |
|---|---|---|---|
| 37,500 | 1/1863 | Fontain | 55—478 |
| 1,697,647 | 1/1929 | Hancock et al. | 55—290 |
| 1,783,181 | 12/1930 | Birkholz | 55—354 |
| 1,945,820 | 2/1934 | Mitchell | 55—497 |
| 2,087,789 | 7/1937 | Allardice. | |
| 2,206,297 | 7/1940 | Curley et al. | 55—400 |
| 2,881,859 | 4/1959 | Nutting | 55—354 |

FOREIGN PATENTS

| | | |
|---|---|---|
| 59,292 | 12/1941 | Denmark. |
| 662,072 | 11/1951 | Great Britain. |

HARRY B. THORNTON, *Primary Examiner.*